United States Patent [19]
Aoki et al.

[11] Patent Number: 5,480,732
[45] Date of Patent: Jan. 2, 1996

[54] MAGNETIC RECORDING MEDIUM

[75] Inventors: Nobuyuki Aoki, Hirakata; Hideo Hatanaka, Neyagawa; Kouji Inoue, Kobe; Yasuhiro Ueyama, Kadoma, all of Japan

[73] Assignee: Matsushita Electric Industrial Co., Ltd., Osaka, Japan

[21] Appl. No.: 995,001

[22] Filed: Dec. 22, 1992

[30] Foreign Application Priority Data

Dec. 26, 1991 [JP] Japan ................... 3-344314

[51] Int. Cl.⁶ .................................. G11B 5/66
[52] U.S. Cl. .................. 428/694 B; 428/694 BS; 428/694 BB; 428/694 BA; 428/694 BH; 428/694 BM; 428/900
[58] Field of Search .................. 428/694, 900, 428/694 B, 694 BS, 694 BB, 694 BA, 694 BH, 694 BM

[56] References Cited

U.S. PATENT DOCUMENTS

| | | | |
|---|---|---|---|
| 4,442,159 | 4/1984 | Dezawa | 428/212 |
| 4,911,951 | 3/1990 | Ogawa et al. | 427/130 |
| 4,965,120 | 10/1990 | Ono et al. | 428/213 |

FOREIGN PATENT DOCUMENTS

| | | |
|---|---|---|
| 49-3121 | 1/1974 | Japan . |
| 60-143433 | 7/1985 | Japan . |
| 60-205821 | 10/1985 | Japan . |
| 61-278020 | 12/1986 | Japan . |
| 63-29334 | 1/1988 | Japan . |
| 63-29318 | 2/1988 | Japan . |
| 63-029318 | 2/1988 | Japan . |
| 143364 | 9/1989 | Japan . |
| 226285 | 6/1990 | Japan . |

*Primary Examiner*—L. Kilman
*Attorney, Agent, or Firm*—Wenderoth, Lind & Ponack

[57] ABSTRACT

A magnetic recording medium comprising a non-magnetic support, a magnetic layer on one surface of said non-magnetic support, a back coating layer on the other surface of said non-magnetic support and a primer layer containing acicular hexagonal ferrite magnetic powder between said non-magnetic support and at least one of said magnetic layer and said back coating layer, which is used with a video recorder fitted for high density recording and in particular, which copes with prolongation of a recording time.

3 Claims, 2 Drawing Sheets

MAGNETIC RECORDING MEDIUM

BACKGROUND OF THE INVENTION

1. Field of the Invention

The present invention relates to a magnetic recording medium which is used with a video recorder fitted for a high density recording, in particular a thin type magnetic recording medium which copes with the prolongation of a recording time. More particularly, the present invention relates to a magnetic recording medium comprising a non-magnetic support, a magnetic layer on one surface of the non-magnetic support, a back coating layer on the other surface of the non-magnetic support and a primer layer containing acicular (needle-form) hexagonal ferrite magnetic powder between the non-magnetic support and at least one of the magnetic layer and the back coating layer.

2. Description of the Related Art

Recently, with the increase of requirements on dezitization and a high recording density such as a large recording capacity, diminishing of a wavelength of a recording signal and decrease of a total tape thickness due to increase of recorded informations are highly desired with a magnetic recording medium, in particular a magnetic recording tape. But, decrease of the total thickness of the magnetic recording tape deteriorates running properties and durability of the tape considerably and is disadvantageous for the electromagnetic conversion characteristics.

Such phenomena are induced by large decrease of rigidity of the tape which is caused by the decrease of the total tape thickness. A reason why the decrease of the tape rigidity influences the running properties and durability of the tape and also the electromagnetic conversion characteristics will be explained by making reference to a video tape.

The video tape runs while being wound around various types of tape guide posts of a VTR equipment at certain angles.

The tape guide posts include an upper side regulating one and a lower side regulating one for regulating a position of the running tape. When the running tape tends to depart from a position regulating post, a force for inhibiting the departure is generated by rigidity of the tape itself, namely a resiliency against an external force which will deform the tape. The tape rigidity acts as a force which controls contacting properties between the tape on which a constant tension is applied during running and a magnetic head, namely a spacing between the tape surface and the magnetic head and contacting stability between them.

Since the above inhibiting force is weakened by the decrease of the tape rigidity caused by the reduction of the total tape thickness, the tape is folded or the tape edges are deformed in a wave form, and further, among the electromagnetic conversion characteristics, readout output decreases and output variation increases. As a method for suppressing the decrease of the rigidity of the tape which causes a problem in the thin video tape having, for example, a thickness of 12 μm in the VHS format and 10 μm in an 8 mm video format, an increase in the rigidity of each of the non-magnetic support, the magnetic recording layer and the back coating layer has been studied.

To increase the rigidity of the non-magnetic support, it has been studied to use a highly rigid high heat resistant material such as an aromatic polyamide and an aromatic polyimide in place of polyethylene terephthalate (hereinafter referred to as "PET") or polyethylene naphthalate (hereinafter referred to as "PEN") which is conventionally used as the non-magnetic support (see Japanese Patent Publication Nos. 3121/1974 and 43364/1989).

While the rigidity of the proposed materials is high, not only are the materials are more expensive than PET or PEN, but their adhesion with the magnetic layer or the back coating layer is poor and they have high moisture absorbance.

Another method for increasing the rigidity of the tape includes the formation of a thin metal layer having high rigidity between the magnetic layer and the non-magnetic support, which is practically used (see Japanese Patent Kokai Publication Nos. 143433/1985, 205821/1985 and 29318/1988).

Since, in the above methods, the adhesion of the magnetic layer or the back coating layer to the thin metal layer greatly decreases or there is a difference in rigidity between the layers, some problems arise, for example, in a tape slitting step.

To increase the rigidity of the magnetic layer or the back coating layer, it has been proposed to increase the content of a filler such as magnetic powder in the magnetic layer, add a reinforcing filler to the layer, or increase the glass transition temperature of a binder resin (see Japanese Patent Publication Nos. 29334/1988 and 26285/1990 and Japanese Patent Kokai Publication No. 278020/1986).

Increase of the content of the magnetic powder in the magnetic layer worsens the durability of the tape. The addition of the reinforcing filler does not improve dispersibility or orientation of the filler but spoils surface smoothness. When the glass transition temperature of the binder resin is increased, the rigidity of the coated layer cannot be increased greatly. Rather, since the binder resin becomes hard, the surface smoothening is prevented, and it is difficult to satisfy the dispersibility and reactivity with other additives in the coated layer and durability at the same time.

As explained above, in connection with the surface smoothening and the decrease of the thickness which are required for the magnetic recording medium so as to comply with the increase of recording density and the recording capacity, it is very difficult to achieve satisfactory running properties and durability while maintaining the electromagnetic conversion characteristics unchanged.

SUMMARY OF THE INVENTION

An object of the present invention is to provide a magnetic recording medium which can maintain or increase strength of the medium as a whole and stabilize medium damage and output without interfering with recording and reading out when the recording medium is highly smoothened and thinned to achieve the high-density-recording and the high capacity.

According to the present invention, there is provided a magnetic recording medium comprising a non-magnetic support, a magnetic slayer on one surface of said non-magnetic support, a back coating layer on the other surface of said non-magnetic support and a primer layer containing acicular hexagonal ferrite magnetic powder between said non-magnetic support and at least one of said magnetic layer and said back coating layer.

Because of the provision of the primer layer containing acicular hexagonal ferrite magnetic powder, the rigidity of the whole magnetic recording medium can be increased without deteriorating the electromagnetic conversion characteristics.

Since each particle of the acicular hexagonal ferrite magnetic powder has an axis of easy magnetization in a direction of a minor axis of the particle, needle directions of the powder particles are oriented in a width direction of the medium by the orientation in any direction. Thereby, anisotropy of the rigidity disappears in the running direction of the medium, and the rigidity of the medium is made larger than that of the non-magnetic support.

Since the acicular hexagonal ferrite magnetic powder is a ferromagnetic powder, it is possible to form a multilayer structure in a single coating step and particle planes can be oriented in one direction-by the application of a magnetic field, so that the rigidity of the medium is easily increased and made isotropic in the running direction of the medium.

DETAILED DESCRIPTION OF THE DRAWINGS

The present invention will be explained in detail by making reference to the accompanying drawings.

Figure 1:
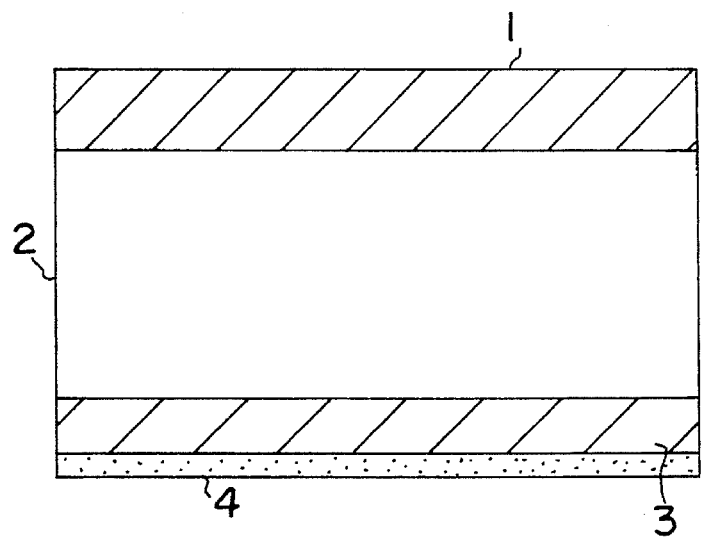
FIG. 1 is a cross sectional view of a video tape of Example 1.
Figure 2:
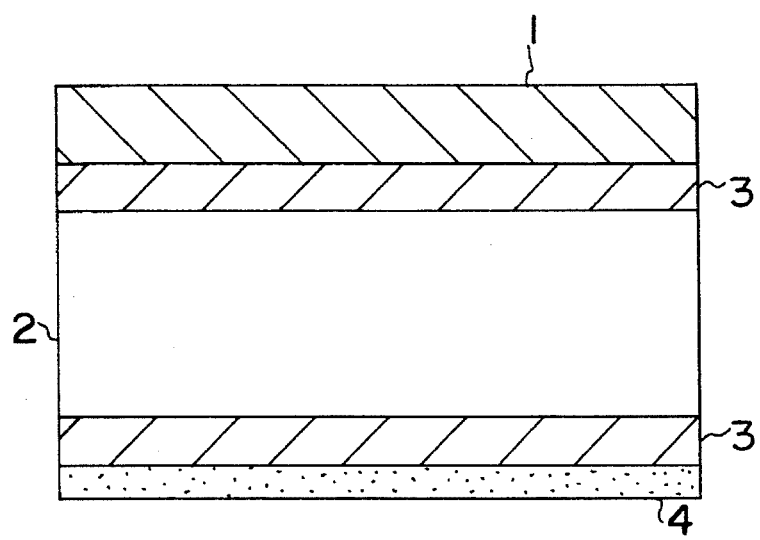
FIG. 2 is a cross sectional view of an example of the magnetic recording medium of the present invention.
Figure 3:
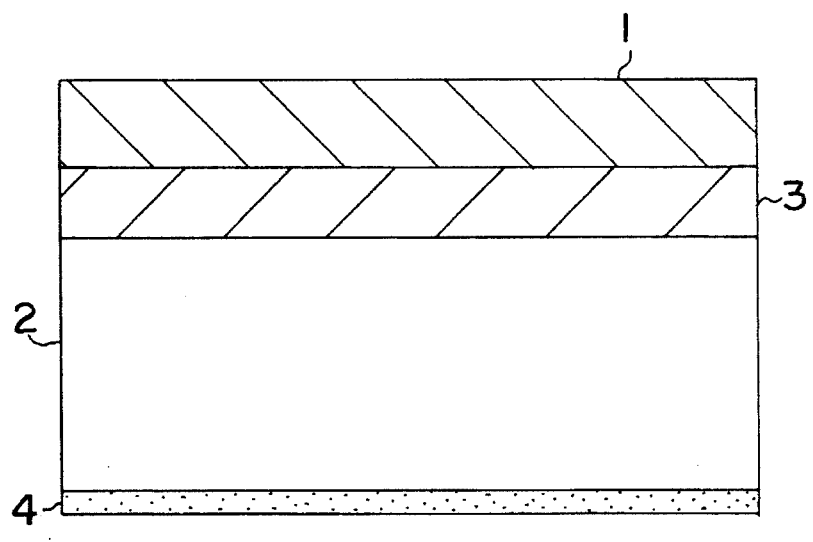
FIG. 3 is a cross sectional view of another example of the magnetic recording medium of the present invention.
Figure 4:
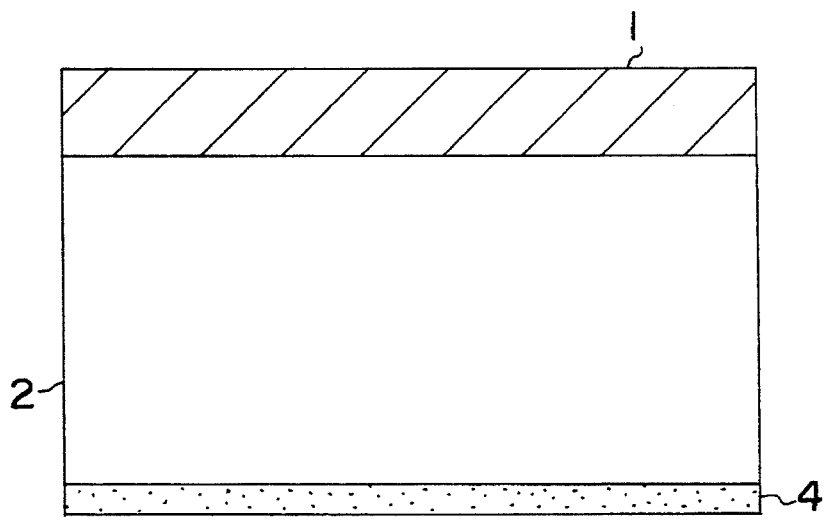
FIG. 4 is a cross sectional view of a video tape of Comparative Example 1.

In FIGS. 1, 2 and 3, numeral 1 stands for a magnetic recording layer, 2 for a non-magnetic support, 3 for a primer layer, and 4 for a back coating layer.

The magnetic recording medium of the present invention is characterized in that the primer layer is provided between the non-magnetic support and the magnetic layer or the back coating layer, or both, and contains the acicular hexagonal ferrite magnetic powder, whereby the rigidity of the medium as a whole-increases and-the anisotropy of the rigidity in the running direction of the medium disappears.

To this end, preferably the acicular hexagonal ferrite magnetic powder has a high aspect ratio (a ratio of a major axis to a minor axis) and is filled in the primer layer in a high density. By the acicular hexagonal ferrite magnetic powder contained in the primer layer, the rigidity of the magnetic recording medium as a whole is improved without deteriorating the electromagnetic conversion characteristics. As a result, it is possible to provide the magnetic recording medium which can maintain the running properties and durability without deteriorating the electromagnetic conversion characteristics. The acicular hexagonal ferrite magnetic powder can be oriented such that the axis of easy magentization is in a direction of thickness of the magnetic recording medium, or in a direction of length of the magnetic recording medium.

The acicular hexagonal ferrite magnetic powder may be a ferromagnetic powder.

Preferably, the acicular hexagonal ferrite magnetic powder has a high aspect ratio. But, the aspect ratio is not limited to a specific range insofar as the acicular hexagonal ferrite magnetic powder particles can be oriented in a certain direction by the magnetic field orientation.

Preferably, the acicular hexagonal ferrite magnetic powder particles in the primer layer are oriented by the magnetic filed orientation in a specific direction in relation to the running direction of the medium. In particular, the needle direction of the acicular hexagonal ferrite magnetic powder is preferably oriented in-the running direction of the medium.

An amount of the acicular hexagonal ferrite magnetic powder is preferably from 100 to 600 parts by weight per 100 parts of a binder resin in the primer layer.

A thickness of the primer layer containing the acicular hexagonal ferrite magnetic powder depends on the format of the magnetic recording medium. Preferably, the thickness is from 0.1 to 2.5 µm. This thickness applies when the primer layer is provided between the non-magnetic support and either one of the magnetic layer and the-back coating layer, or between the non-magnetic support and both of the magnetic layer and the back coating layer.

The primer layer may be formed by coating a composition comprising the acicular hexagonal ferrite magnetic powder, the binder resin and optionally suitable additives in a suitable solvent on one or both surfaces of the non-magnetic support and drying it.

The magnetic layer may be a coating type one or a thin metal layer type one. As the magnetic material used for forming the magnetic layer, any of the conventionally used ones can be used. Examples of the magnetic material are metal oxide magnetic powder such as $\gamma$-$Fe_2O_3$, cobalt-containing $Fe_2O_3$, cobalt-containing $Fe_3O_4$, $CrO_2$, barium ferrite, etc.; and non-oxide magnetic metals or metal alloys such as Fe, Fe—Ni, Fe—Co, etc.

The back coating layer may be formed by a conventional method. For example, a back coating paint comprising a non-magnetic powder, a binder resin, a dispersant, a lubricant and a solvent is coated directly on the surface of the non-magnetic support or the already formed primer layer and dried. If necessary, the surface of the back coating layer is smoothened or thermally treated.

Examples of the binder resin to be contained in the magnetic layer, the back coating layer and the primer layer are thermoplastic resins such as polyvinyl chloride resin, polyurethane resin and polyester resin in combination with an isocyanate compound, UV curable or electron-ray curable resins having a double bond, or mixtures thereof.

The non-magnetic powder in the back coating layer is used to improve the running properties, electrical conductivity, light-shielding and the like. Examples of the non-magnetic powder are carbon black, zinc oxide, calcium carbonate, magnesium sulfate, or mixtures thereof. If necessary, aluminum oxide, chromium oxide or titanium oxide can be added.

The non-magnetic support may be made of any of conventionally used resin materials. Examples of the resin material are polyesters such as PET and PEN; polyolefins such as polyethylene and polypropylene; polyimide; and aromatic polyamide. Among them, polyesters are preferred in view of the balance among the durability, rigidity and cost of the non-magnetic support.

The magnetic layer, the back coating layer and the primer layer may be formed successively or simultaneously. The two layers which are formed on the same surface of the non-magnetic support are preferably formed in one step.

A coating composition for each of the magnetic layer, the back coating layer and the primer layer is prepared by kneading the components using a known kneading machine such as a roll mill, a kneader, a double planetary mixer, an agitator mill, a sand mill, a pin mill, a ball mill, a pebble mill or a combination thereof.

PREFERRED EMBODIMENTS OF THE INVENTION

The present invention will be illustrated by the following Examples, in which "parts" are by weight.

EXAMPLE 1

In this Example, as a magnetic powder in a magnetic layer, there was used ferromagnetic iron oxide powder having a major axis length of 0.15 μm, an aspect ratio of 8, a coercive force of 63.7 KA/m, a saturation magnetization of 72 emu/g and a BET specific surface area of 48 m$^2$/g.

The magnetic powder (100 parts), a polyvinyl chloride resin (8 parts, a polyurethane resin (8 parts), carbon black (2 parts), alumina (7 parts), myristic acid (1 part), butyl stearate (2 parts), a mixed solvent of methyl ethyl ketone (100 parts), methyl isobutyl ketone (50 parts), toluene (100 parts) and cyclohexanone (50 parts), and a hardener (4 parts) were kneaded in a pressure kneader for 2 hours, and then the mixture was diluted with the solvent to adjust a viscosity suitable for sand milling and dispersed in a sand mill to obtain a dispersion.

Thereafter, a polyisocyanate compound (Colonate L manufactured by Nippon Polyurethane Co., Ltd.) (4 parts) was added to the dispersion and which was then through a filter having an average pore size of 1 μm to obtain a magnetic paint (A) for the magnetic layer.

A primer layer paint (B-1) was prepared in the same manner as above except that an acicular hexagonal ferrite magnetic powder having a plate diameter of 0.25 μm, an aspect ratio of 10 and a BET specific surface area of 25 m$^2$/g was used in place of the ferromagnetic iron oxide powder.

A back coating layer paint (B-2) was prepared by mixing and dispersing carbon black having an average primary particle size of 20 μm (100 parts), a Co-doped α-Al$_2$O$_3$ (3 parts), a polyurethane resin (45 parts), a nitrocellulose resin (45 parts) in a mixed solvent (methyl ethyl ketone/toluene/cyclohexanone=2/2/1 by weight) (600 parts) in a ball mill and adding a polyisocyanate compound (Colonate L manufactured by Nippon Polyurethane Co., Ltd.) (10 parts), followed by filtration through a filter having an average pore size of 2 μm.

The magnetic layer paint (A) was coated on one surface of a PET film having a thickness of 7 μm, oriented by a magnetic field and dried, followed by planishing by super calendering to obtain a raw-film roll having a magnetic layer of 2.5 μm in thickness.

On the other surface of the raw film roll, the primer layer paint (B-1) and the back coating layer paint (B-2) were simultaneously coated with a coater having two die nozzles, oriented by a magnetic field vertically to the film plane and dried, followed by planishing by super calendering to obtain a magnetic tape film having a total thickness of 12 μm [(A): 2.5 μm, (B-1): 2.0 μm, (B-2): 0.5 μm].

The magnetic tape film was slit to a width of a half inch to obtain a sample video tape.

EXAMPLE 2

The same magnetic paint (A), primer layer paint (B-1) and back coating layer paint (B-2) as used in Example 1 were used.

On one surface of a PET film having a thickness of 7μ m, the paints (A) and (B-1) were simultaneously coated with a coater having two die nozzles which were arranged in series, oriented, dried, calendered and cured. Thereafter, on the other surface of the PET film, the paints (B-1) and (B-2) were coated in the same way as above, oriented, dried and planished by super calendering to obtain a magnetic tape film having a total thickness of 12 μm [(A): 2.5 μm, (B-1): 1.0 μm, non-magnetic support: 7 μm, (B-1): 1.0 μm, (B-2): 0.5 μm].

The magnetic tape film was slit-to a width of a half. inch to obtain a sample video tape.

EXAMPLE 3

The same magnetic paint (A), primer layer paint (B-1) and back coating layer paint (B-2) as used in Example 1 were used.

On one surface of a PET film having a thickness of 7 μm, the paints (A) and (B-1) were simultaneously coated with a coater having two die nozzles which were arranged in series, oriented, dried, calendered and cured. Thereafter, on the other surface of the PET film, the back coating paint (B-2) was coated in the same way as above, oriented, dried and planished by super calendering to obtain a magnetic tape film having a total thickness of 12 μm [(A): 2.5 μm, (B-1): 2.0 μm, (B-2): 0.5 μm].

The magnetic tape film was slit to a width of a half inch to obtain a sample video tape.

EXAMPLE 4

In the same;manner as in Example 1 except that acicular barium ferrite magnetic powder having an average particle size of 1 μm was used in the primer layer primer (B-1) in place of the acicular hexagonal ferrite magnetic powder, a magnetic tape film having a total thickness of 12 μm [(A): 2.5 μm, (B-1): 2.0 μm, (B-2): 0.5 μm] was obtained.

The magnetic tape film was slit to a width of a half inch to obtain a sample video tape.

Comparative Example 1

The same magnetic paint (A) as used in Example 1 was coated on one surface of a PET film having a thickness of 9 μm, oriented by a magnetic field, dried and planished by super calendering to obtain a raw film roll having a magnetic layer of 2.5 μm in thickness. Thereafter, on the other surface of the raw film roll, the same back coating paint (B-1) as used in Example 1 was coated with a die nozzle coater, dried and heat treated to obtain a magnetic tape film having a total thickness of 12 μm [(A): 2.5 μm, (B-2): 0.5 μm].

The magnetic tape film was slit to a width of a half inch to obtain a sample video tape.

Comparative Example 2

In the same manner as in Comparative Example 1 except that a PEN film was used in place of the PET film, a sample video tape was produced.

Comparative Example 3

In the same manner as in Example 1 except that a plate-form barium ferrite magnetic powder having an average plate diameter of 0.3 μm was used in the primer layer paint (B-1) in place of the acicular hexagonal ferrite magnetic powder, a sample video tape was produced.

Comparative Example 4

On one surface of a PET film having a thickness of 7 μm, the same magnetic paint (A) as used in Example 1 was coated, oriented by a magnetic field and dried, followed by planishing by super calendering to obtain a raw film roll having a magnetic layer of 2.5 μm in thickness. Thereafter, on the other surface of the raw film roll, the primer layer paint (B-1) was coated by a die nozzle coater, oriented by a magnetic field, dried and heat treated to obtain a magnetic tape film having a total thickness of 12 µm [(A): 2.5 µm, (B-1): 2.5 µm].

The magnetic tape film was slit to a width of a half inch to obtain a sample video tape.

Each of the sample video tapes produced in Examples and Comparative Examples was evaluated as follows:

(1) Young's modulus (GPa) of the tape

Using a tensile tester (manufactured by Orientec Co., Ltd.), a tensile rigidity in a machine direction (MD) or a transverse direction (TD) is measured. The tensile rigidity in TD is measured with a sample having a length of ½ inch.

(2) Tape stiffness (mg)

Using a loop stiffness tester (manufactured by Toyo Seiki Co., Ltd.), stiffness (buckling strength) in the machine direction or transverse direction is measured.

(3) RF out put (dB) at 7 MHz

Using a commercially available S-VHS video deck, a RF output at 7 MHz is measured with each sample tape.

(4) Running durability and output stability

The running stability is evaluated by running each tape on the commercially available S-VHS video deck and observing a tape surface condition with eyes after 100 passes.

The output stability is evaluated in terms of an evenness (maximum/minimum) of a readout output envelope during the reading out of the output signals.

The results are shown in the Table.

TABLE

| Example No. | Young's modulus (GPa) MD/TD | Loop stiffness (mg) MD/TD | RF output (dB) | Tape durability | Envelope evenness (%) |
|---|---|---|---|---|---|
| 1 | 17.9/17.8 | 135/128 | +0.2 | Good | 85 |
| 2 | 18.9/18.7 | 138/129 | +0.5 | Good | 89 |
| 3 | 17.1/16.6 | 140/125 | +0.2 | Fair | 83 |
| 4 | 19.2/18.6 | 141/130 | +0.3 | Good | 86 |
| C. 1 | —/— | 82/74 | −0.7 | One-side elongation Edge folding | 57 |
| C. 2 | —/— | 91/85 | −0.5 | Edge folding | 69 |

TABLE-continued

| Example No. | Young's modulus (GPa) MD/TD | Loop stiffness (mg) MD/TD | RF output (dB) | Tape durability | Envelope evenness (%) |
|---|---|---|---|---|---|
| C. 3 | 16.9/8.92 | 129/76 | −0.6 | One-side elongation Edge folding | 68 |
| C. 4 | 16.6/15.8 | 131/113 | −0.9 | One-side elongation Edge folding | 48 |

As seen from the above results, the sample tapes according to the present invention did not suffer from the deterioration of the electromagnetic conversion characteristics and were excellent in running durability and output stability, when their total thickness was made small.

While the S-VHS video tapes were used in the above Example, it is possible to apply the present invention to an 8 mm video tape, an audio tape, a magnetic tape for a computer, a floppy disc, and any other magnetic recording media.

What is claimed is:

1. A magnetic recording medium comprising a non-magnetic support, a magnetic layer on one surface of said non-magnetic support, a back coating layer on the other surface of said non-magnetic support and a primer layer between said non-magnetic support and at least one of said magnetic layer and said back coating layer, said primer layer containing acicular hexagonal ferrite magnetic powder particles having an axis of easy magnetization in a direction of a minor axis of the acicular particle, which axis is oriented in a direction of thickness of said magnetic recording medium or in a length direction of said magnetic recording medium.

2. The magnetic recording medium according to claim 1, wherein said acicular hexagonal ferrite magnetic powder is oriented such that an axis of easy magnetization is in a direction of thickness of the magnetic recording medium.

3. The magnetic recording medium according to claim 1, wherein said acicular hexagonal ferrite magnetic powder is oriented such that an axis of easy magnetization is in a direction of length of the magnetic recording medium.

* * * * *